(12) United States Patent
Bishop, Jr. et al.

(10) Patent No.: US 10,440,776 B2
(45) Date of Patent: Oct. 8, 2019

(54) NON-STANDARD ALTERNATE PROTOCOL BASED SATELLITE COMMUNICATIONS

(71) Applicant: HARRIS CORPORATION, Melbourne, FL (US)

(72) Inventors: James William Bishop, Jr., Colorado Springs, CO (US); Brandon Hinton, Hamilton, VA (US); Leonard Perry Seip, Ashburn, VA (US); William N. Shores, Phoenix, AZ (US)

(*) Notice: Subject to any disclaimer, the term of this patent is extended or adjusted under 35 U.S.C. 154(b) by 110 days.

(21) Appl. No.: 15/461,665

(22) Filed: Mar. 17, 2017

(65) Prior Publication Data

US 2018/0270899 A1    Sep. 20, 2018

(51) Int. Cl.

| H04W 80/08 | (2009.01) |
| H04W 76/12 | (2018.01) |
| H04W 4/10 | (2009.01) |
| H04W 40/24 | (2009.01) |
| H04B 7/185 | (2006.01) |
| H04W 84/06 | (2009.01) |

(52) U.S. Cl.
CPC ...... *H04W 80/085* (2013.01); *H04B 7/18567* (2013.01); *H04W 4/10* (2013.01); *H04W 40/24* (2013.01); *H04W 76/12* (2018.02); *H04W 84/06* (2013.01)

(58) Field of Classification Search
CPC .............. H04L 2012/5068; H04L 12/66; H04L 2012/46; H04L 2012/5618; H04L 12/46; H04L 12/4625; H04L 12/462; H04L 12/40097; H04L 12/40091; H04W 84/12; H04W 88/08; H04W 80/04; H04W 88/06; H04W 84/18; H04W 74/08; H04B 7/18582; H04B 7/18584; H04B 7/18508; H04B 7/18515; H04B 7/18576

USPC .... 370/310.2, 328, 338, 349, 385, 401, 402, 370/316

See application file for complete search history.

(56) References Cited

U.S. PATENT DOCUMENTS

| 5,509,004 A | 4/1996 | Bishop, Jr. et al. |
| 5,523,997 A | 6/1996 | Bishop, Jr. |
| 5,717,830 A | 2/1998 | Sigler et al. |
| 5,878,036 A * | 3/1999 | Spartz ................. H04L 63/0428 370/335 |

(Continued)

FOREIGN PATENT DOCUMENTS

| WO | 9746036 A1 | 12/1997 |
| WO | 9938084 A1 | 7/1999 |
| WO | 0131813 A1 | 5/2001 |

OTHER PUBLICATIONS

EPO Application No. 18161937.0-1219, European search report dated Sep. 10, 2019.

*Primary Examiner* — Brenda H Pham
(74) *Attorney, Agent, or Firm* — Watson IP Group, PLC; Dan Fiul

(57) ABSTRACT

One example includes a capability gateway that is comprised of a receiver and a transmitter. The receiver receives, from a ground station associated with a satellite system, a standard protocol associated with the ground station and a non-standard alternate protocol that includes alternate service layers inserted into an inter-layer boundary of standard radio layers, the alternate service layers providing end-to-end signaling between the capability gateway and a user equipment. The transmitter transmits the non-standard alternate protocol to the user equipment.

20 Claims, 9 Drawing Sheets

(56) References Cited

U.S. PATENT DOCUMENTS

| | | | |
|---|---|---|---|
| 6,047,161 A | 4/2000 | Sowles et al. | |
| 6,408,179 B1 | 6/2002 | Stosz et al. | |
| 6,415,329 B1* | 7/2002 | Gelman | H04L 12/66 370/401 |
| 6,456,855 B1 | 9/2002 | Stosz et al. | |
| 6,529,740 B1 | 3/2003 | Ganucheau, Jr. et al. | |
| 6,584,083 B1* | 6/2003 | Toporek | H04B 7/18589 370/316 |
| 6,850,497 B1 | 2/2005 | Sigler et al. | |
| 8,086,855 B2 | 12/2011 | Katz et al. | |
| 8,274,925 B2 | 9/2012 | Jacks | |
| 8,681,690 B2 | 3/2014 | Wohlford et al. | |
| 8,874,164 B2 | 10/2014 | Batchu et al. | |
| 9,066,321 B1 | 6/2015 | Kikta et al. | |
| 9,131,330 B2 | 9/2015 | Muhanna et al. | |
| 2003/0123481 A1* | 7/2003 | Neale | H04B 7/18582 370/466 |
| 2007/0133418 A1* | 6/2007 | Agarwal | H04W 80/06 370/236 |
| 2013/0100895 A1 | 4/2013 | Aghili et al. | |
| 2013/0315164 A1* | 11/2013 | Arur | H04W 76/40 370/329 |
| 2013/0329653 A1 | 12/2013 | Russell, Jr. et al. | |
| 2014/0038622 A1 | 2/2014 | Zhu et al. | |
| 2015/0052360 A1* | 2/2015 | Ravishankar | H04L 63/0428 713/171 |

\* cited by examiner

NON-STANDARD ALTERNATE PROTOCOL BASED SATELLITE COMMUNICATIONS

This invention was made with U.S. Government support and the U.S. Government has certain rights in the invention.

TECHNICAL FIELD

This disclosure relates generally to satellite communications and, more particularly to non-standard alternate protocol based satellite communications.

BACKGROUND

Satellite communications rely on a transmitting device, for example a user equipment (UE), that transmits a radio signal to a satellite. The satellite in turn receives the radio signal from the transmitting device and transmits the received signal to a ground receiver. Wireless network standards for such communications implement useful radio layers optimized to an environment, but standard services above that are often too chatty or otherwise suboptimal for some customer applications. Developing new services that satisfy these applications and requirements is often too expensive due to tight radio/service coupling, vendor locks, or impossible due to inappropriate performance.

SUMMARY

One example includes a capability gateway that is comprised of a receiver and a transmitter. The receiver receives, from a ground station associated with a satellite system, a standard protocol associated with the ground station and a non-standard alternate protocol that includes alternate service layers inserted into an inter-layer boundary of standard radio layers, the alternate service layers providing end-to-end signaling and data transport between the capability gateway and a user equipment. The transmitter transmits the non-standard alternate protocol to the user equipment.

Another example includes a communication method comprising receiving, at a capability gateway from a ground station associated with a satellite system, a standard protocol associated with the ground station and a non-standard alternate protocol that includes alternate service layers inserted into an inter-layer boundary of standard radio layers, the alternate service layers providing end-to-end signaling and data transport between the capability gateway and a user equipment; and transmitting the non-standard alternate protocol to the user equipment.

Another example includes another capability gateway comprised of a receiver, a transmitter, and an inline bridge. The receiver receives, from a ground station associated with a satellite system, a standard protocol associated with the ground station and first and second non-standard alternate protocols that includes alternate service layers inserted into an inter-layer boundary of standard radio layers, the alternate service layers providing end-to-end signaling and data transport between the capability gateway and a user equipment, and end-to-end signaling and data transport between an application server and the user equipment. The transmitter transmits the first and second non-standard alternate protocols to the user equipment and transmits the second non-standard alternate protocol to the application server. The inline bridge receives the standard protocol associated with the ground station and transmits the standard protocol associated with the ground station to a mobile switching center via a GSM/A-Interface (CCS7) interface.

DETAILED DESCRIPTION

This disclosure relates to satellite communications and, more particularly to non-standard alternate protocol based satellite communications. For any given wireless network utilizing a standards-based protocol suite, there is a mid-stack point below which channel resources are managed, and above which service actions occur. In traditional satellite system design, the lower layers are changed from the base terrestrial cellular standard in order to adapt them to a different radio environment of the satellite geometry and spectrum allocations. The upper layers are generally unchanged in order to take advantage of the multitude of standard services and equipment that implement them, or in some cases minimally changed to provide incrementally enhanced service variants. Mobile satellite service systems that employ this architectural model include the GMR-1 series of standards and the circuit-mode telephony aspects of the Iridium network, both of which reuse the well-known GSM upper layers for their service control protocol. The example embodiments disclosed herein invert the traditional model, breaking into the protocol stack at that same midpoint to provide alternative services in the upper layers while reutilizing the lower-layer resources provided by the network as it exists. Alternate upper-layers of a non-standard alternate protocol provide capabilities that are built upon the lower-layer operations (primitives) in different combinations and with different upper-layer signaling constructs from those of the standard services.

To process such alternate upper layers, a capability gateway and application server process these alternate service layers and provide improved and/or new services within a satellite communications system. The capability gateway and the application server allow for improvement of services within the satellite communication system. In an example embodiment, the capability gateway and the application server allow for new services that are not typically possible within a typical satellite communication system.

Figure 1:
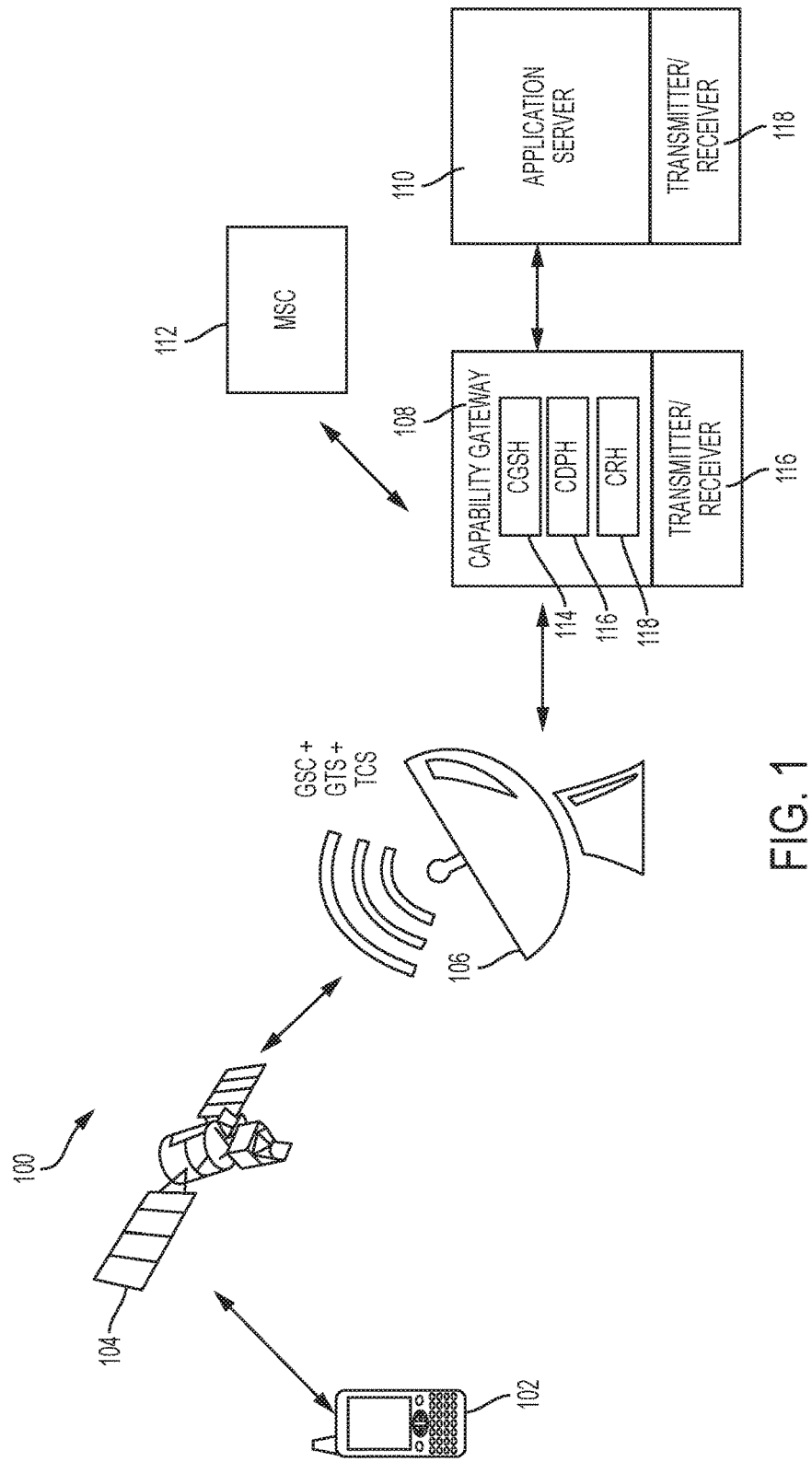
FIG. 1 illustrates an example system utilizing a capability gateway and an application server, in accordance with an example embodiment.

FIG. 1 illustrates an example system 100 utilizing a capability gateway (CG) 108 and an application server (AS) 110, in accordance with an example embodiment. In particular, the system 100 include a user equipment (UE) 102, a satellite system 104, a ground station 106, the CG 108, an AS 110, and a mobile switching center (MSC) 112 in communication with the CG 108. In an example embodiment, a single AS 110 supports a plurality of CGs 108. The CG 108 includes a transmitter/receiver 116 and the AS 110 includes a transmitter/receiver 118, the transmitter/receiver 116 and the transmitter/receiver 118 sending and receiving the communications described herein. The ground station 106 includes at least one of gateway station controller (GSC), a gateway transceiver station (GTS), and a traffic controller subsystem (TCS). The UE 102, the satellite system 104, the ground station 106, the CG 108, and the AS 110, and the MSC 112 are each computer controlled. Each of these items of equipment include one or more processors, microprocessors, controllers, network adapters, memory, transceivers, user interfaces, and the like, and execute programming instructions and various operating systems stored in memories thereof.

The network element pair of the CG 108 and the AS 110 support non-standard alternate protocol layers of one or more non-standard alternate protocols that provide improved and/or novel services that are better matched than typical standard protocols to the needs of a user of the UE 102 and applications executing on the UE 102. The system 100 provides for efficient alternatives to the standard existing mobility and services protocols for both signaling and traffic, offering extensibility beyond typical existing mobility and services protocols while retaining the lower layers of any particular system such that its wireless physical links and radio resource management continue to be utilized advantageously. The system 100 provides gains that come from consolidating mobility management and service invocation at the CG 108 utilizing a minimal signaling unit that accomplishes all these benefits in a single terminal-network round-trip exchange. This compares favorably to the standard existing mechanisms, which separate the mobility management and service invocation into multiple exchanges that add significantly to the setup time for a particular service.

The system 100 works with standard networks (for example, GEO-Mobile Radio (GMR)-1, 3rd Generation Partnership Project (3GPP), Iridium, Thuraya, etc.) to provide new services atop standard native radio layers (e.g., Radio Resource Management (RR 210 discussed below) and below) without utilizing the existing service layers (mobility management (MM), call control (CC), etc.). However, in an example embodiment existing MM/CC layers remain within the stack. The system 100 does not rely on proxy behavior, instead implementing non-standard alternate service layers that are applied without having to represent non-standard users as standard users in a non-access stratum. The system 100 is implemented as a pass through topology in which a radio-layers network element cannot provide additional fan-out, with the CG 108 being situated between the radio-layers network element and a standard service-layer network element. In an alternate example embodiment, the system 100 is implemented as a standalone topology in which the radio-layers network elements are either replicated or provide additional fan-out so the CG 108 is situated alongside the standard service-layer network element.

The UE 102 adds, transmits, receives, and processes these non-standard alternate service layers of the non-standard alternate protocol in addition to a standard protocol utilized to provide end-to-end signaling and data transport between the UE 102 and the ground station 106. The UE 102 adds the alternate service layers to the standard protocol utilized to communicate with the ground station 106. The UE 102 transmits the alternate service layers and the standard protocol utilized to communicate between the ground station 106 and the UE 102, via the satellite system 104. The UE 102 receives the alternate service layers and the standard protocol utilized to communicate between the ground station 106 and the UE 102, via the satellite system 104. The UE 102 utilizes the non-standard alternate service layers as a basis to provide end-to-end signaling and data transport between the UE 102 and the CG 108. In an example embodiment, the UE 102 utilizes the alternate service layers as a basis to implement communications between the UE 102 and the AS 110.

The satellite system 104 transmits and receives messages from one or more UEs 102. The satellite system 104 transmits and receives messages from the ground station 106. The satellite system 104 includes one or more satellites in constellation over the Earth that provides voice and/or data coverage to UEs 102, for example, satellite phones, pagers and integrated transceivers positioned on the Earth's surface. In an example embodiment, the satellite system 104 is a low Earth orbiting satellite system. In an example embodiment, the satellite system 104 is GMR-1, Iridium, Thuraya, or any other satellite system that provides voice and/or data coverage. In a further example embodiment, it is also possible to apply this approach in a non-satellite (that is, terrestrial) wireless communication system such as those in the 3GPP family of standards including GSM, UMTS, and LTE; in this case the terrestrial wireless network would replace satellite system 104 in system 100. Since the non-standard alternate service layers transmitted by and to the UE 102 are not part of a standard protocol utilized within the system 100, the satellite system 104 does not recognize the non-standard alternate service layers and thus passes them between the UE 102 and the GS 106 without processing the alternate service layers. Passing the non-standard alternate service layers between the UE 102 and the GS 106 therefore does not impact the processing bandwidth of the satellite system 104.

The ground station 106 receives and processes the standard protocol utilized to communicate between the ground station 106 and the UE 102, via the satellite system 104. In addition, the ground station receives the non-standard alternate service layers transmitted by the UE 102. The ground station 106 communicates with the CG 108 with another standard protocol normally utilized to communicate between the ground station 106 and the MSC 112. The non-standard alternate service layers transmitted by the UE 102 are not part of the standard protocol utilized between the ground station 106 and the UE 102, and as such the ground station 106 does not recognize the alternate service layers transmitted by the UE 102. Therefore, the ground station 106 passes the alternate service layers to the CG 108 without processing the non-standard alternate service layers. The ground station 106 transmits the non-standard alternate service layers to the CG 108 in addition to the standard protocol utilized between the ground station 106 and the CG 108.

The CG 108 adds, transmits, receives, and processes the non-standard alternate service layers in addition to a standard protocol utilized to provide end-to-end signaling and data transport between the ground station 106 and the CG 108. The CG 108 processes at least a portion of the non-standard alternate service layers. At least a portion of these non-standard alternate service layers are utilized by the CG 108 to provide end-to-end signaling and data transport between the UE 102 and the CG 108. In an example embodiment, a portion of the alternate service layers are not processed by the CG 108 and therefore are transmitted to the AS 110 for processing.

The CG 108 supports a plurality of Application Servers 110 and a plurality of MSCs 112. The CG 108 includes various handlers that include, for example, a CG Session Handler (CGSH) 114 that interacts with UE 102 via the intervening satellite system 104, establishing/releasing sessions and transferring data. The CG 108 further includes a Capability Distribution Protocol Handler (CDPH) 116 that interacts with external hosts, and in an example embodiment the AS 110, via an IP network, establishing/releasing delivery connections and transferring data. In addition, the CG 108 further includes a CG Routing Handler (CRH) 118 that manages whether a session/connection is allowed to occur, if so where its data goes, and how (that is, which capability of Capability Gateway 108 is used—real time relay or store and forward). In an example embodiment, the CG 108 either intercedes or branches within another gateway to provide general user data transport capabilities.

The AS 110 receives the remaining portion of the non-standard alternate service layers from the CG 108 that are not utilized to provide end-to-end signaling and data transport between the CG 108 and the UE 102. These non-standard alternate service layers are utilized by the AS 110 to provide end-to-end signaling and data transport between the UE 102 and the AS 110. The AS 110 provides unique application services for the UE 102 based on these non-standard alternate service layers. The alternate service layers allow the AS 110 to improve upon existing services that are supported by the satellite system 104. Alternately, the non-standard alternate protocol layers allow the AS 110 to provide unique services to the UE 102, that is services not possible or too difficult to implement efficiently utilizing existing standard service protocols. As indicated in the previous paragraph, an embodiment includes more than one AS 110, with each providing one or more specific services—the applications to which this element's name refers.

The AS 110 supports one or more of the following services. The AS 110 supports single-message transmission in which store and forward sessions are established to move one mobile originated (MO) and/or one mobile terminated (MT) message. The AS 110 also supports multi-message exchanges on a single session. The AS 110 holds sessions open for complete end-to-end transactions such as payments, access authorization, inventory operations, other database queries, etc. The AS 110 supports Extensible Messaging and Presence Protocol (XMPP)-based messaging and presence. In an example embodiment, XMPP is utilized for Internet-of-Things (IoT), Voice over Internet Protocol (VoIP), and more applications. The AS 110 supports commercial off-the-shelf (COTS)/free or open source software (FOSS) clients & servers, allowing for easy addition of COTS/FOSS/government off-the-shelf (GOTS) applications. The AS 110 also supports voice calling with VoIP interoperability and standard codecs, building on the real-time connection capability by adding standard codec(s) and numbering plan support. The AS 110 supports a host application such as a VoIP system, which provides interconnect with voice networks. The AS 110 supports IP-based data streaming and networking interconnect. The AS 110 supports local and global groups for position location information (PLI), Push-to Talk (PTT), etc., single-region and multi-region coverage, and backhauled interconnection, as needed. The AS 110 supports Short Message Service (SMS), Email, IP packet flows, native wireless network services, etc.

Figure 2:
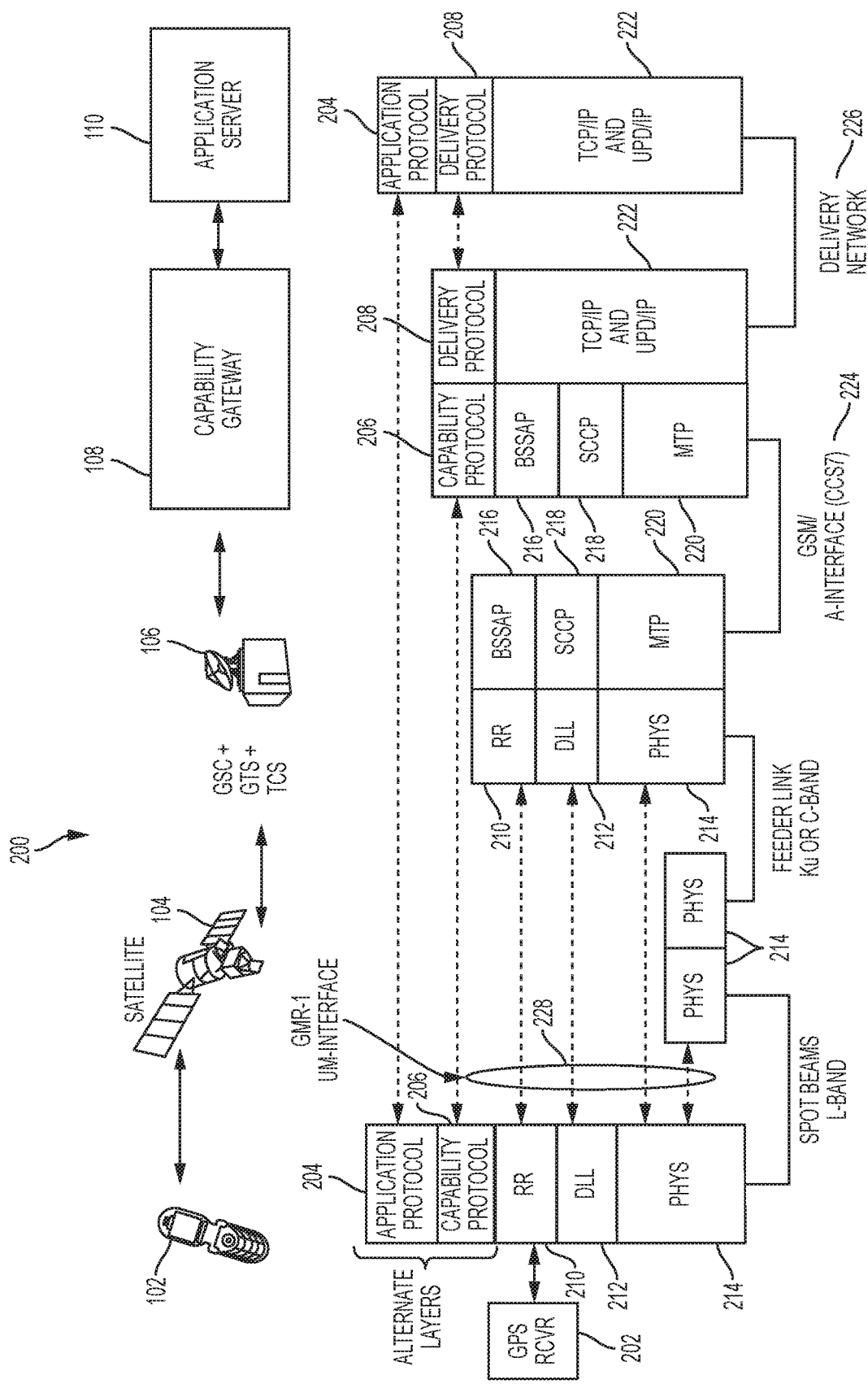
FIG. 2 illustrates an example system implementing a standalone topology for the capability gateway, in accordance with an example embodiment.

FIG. 2 illustrates an example system 200 implementing a standalone topology for the CG 108, in accordance with an example embodiment. In this example, the CG 108 is implemented as a standalone CG 108 in the GMR-1 network. The standalone implementation of the CG 108 is utilized in a topology when a single ground station 106 is able to fan out to multiple MSCs 112, or like elements. Alternately, the standalone implementation of the CG 108 is utilized if a dedicated ground station 106 is servicing the CG 108.

In an example embodiment, the UE 102 establishes a GMR-1 Um-Interface 228 with the ground station 106, and establishes communications via an L-band within spot beams of the satellite system 104. The satellite system 104 establishes communications with the ground station 106 via a feeder link in either the Ku or C-Band of the satellite system 104. As illustrated, the UE 102 and the ground station 106 communicate therebetween by adding standard protocol layers that include the RR 210, data link layer (DLL) 212, and physical layers 214 to communicate packets. In an example embodiment, the UE 102 further includes a Global Positioning System (GPS) receiver 202. The UE 102 adds GPS information derived from the GPS receiver 202 into the RR layer 210. The UE 102 also adds the non-standard alternate service layers, for example a capability protocol (CP) 206 and optionally an application protocol (AP) 204, to the standard protocol layers that are utilized to provide end-to-end signaling and data transport between the UE 102 and the ground station 106 and the AS 110. In accordance with an example embodiment, the CP 206 and AP 204 are inserted into an inter-layer boundary of a standard protocol utilized by the UE 102, for example inserted above the RR protocol layer 210 of the standard radio layers RR 210, DLL 212, and the physical layers below 214.

In an example embodiment, the UE 102 inserts the non-standard alternate service layers, CP 206 and in an example embodiment AP 204, into the protocol stack above the RR layer 210 of the standard protocol utilized to provide end-to-end signaling and data transport between the UE 102 and the ground station 106. The UE 102 inserts the AP 204 above the CP 206. The UE 102 combines Mobile satellite services (MSS) channels and lower layer protocols with the unique alternate service layers including non-standard alternative upper layer overlay protocols disclosed herein to provide for unique capabilities and applications. The CP 206 provides for end-to-end signaling between the UE 102 and the CG 108 and data exchange for device-side capabilities. In an example embodiment, the AP 204 provides for end-to-end signaling and data transport between the UE 102 and the AS 110, and data exchange for applications supported by the AS 110. In an example embodiment, the UE 102 utilizes the RR 210 insertion point by replacing the standard upper layers (MM, CC, etc.) with the upper layers of the CP 206 and AP 204. In an example embodiment, each application service supported by the UE 102 and the AS 110 utilizes a unique AP 204, with the CP 206 providing both common and specific aspects, specific to the application service supported by the AS 110, for the end-to-end signaling and data transport between the UE 102 and the CG 108. The UE 102 transmits the CP 206 and AP 204 protocols to the CG 108 and the AS 110, respectively, via the satellite system 104.

In an example embodiment, the ground station 106 establishes communications with the CG 108 via a Global System for Mobile (GSM) communication interface, for example a GSM/A-Interface (CCS7) 224. As discussed above, the ground station 106 does not recognize the non-standard alternate service layers, for example the CP 206 and AP 204, transmitted by the UE 102. The ground station 106 passes the CP 206 and the AP 204 to the CG 108 without processing these protocols. The ground station 106 transmits the CP 206 and AP 204 to the CG 108 in addition to the standard protocol utilized by the ground station 106 to provide end-to-end signaling and data transport between the ground station 106 and the CG 108. In an example, the ground station 106 and the CG 108 communicate utilizing standard protocol layers that include Base Station Subsystem Application Part (BSSAP) 216, Signaling Connection Control Part (SCCP) 218, and Message Transfer Part (MTP) 220.

As discussed above, the CG 108 adds, transmits, and receives the non-standard alternate service layers in addition to the standard protocol utilized to provide end-to-end signaling and data transport between the ground station 106 and the CG 108. In this example, the CG 108 adds the CP 206, and in an example embodiment the AP 204, to the standard protocol utilized to provide end-to-end signaling and data transport between the ground station 106 and the CG 108. In an example embodiment, the non-standard CP 206, and in an example embodiment the non-standard AP 204, are inserted into the protocol stack above the standard BSSAP layer of the standard protocol utilized to provide end-to-end signaling and data transport between the ground station 106 and the CG 108.

The CG 108 further communicates with the AS 110 via a delivery network 226. The CG 108 typically establishes communications with an AS 110 via a secure private line. In an example embodiment, the CG 108 communicates with each AS 110 via the delivery network 226 utilizing Transmission Control Protocol/Internet Protocol (TCP/IP) and/or User Datagram Protocol (UDP)/IP 222.

In an example embodiment, the CG 108 further relies on a Delivery Protocol (DP) 208 to communicate with each AS 110. In an example, the DP 208 is inserted above the protocol stack of the TCP/IP and/or UDP/IP utilized to provide end-to-end signaling and data transport between the CG 108 and the AS 110. The DP 208 provides a mapping to the capabilities of the CP 206 in terms that AS 110 can understand, as well as a mechanism to transport the AP 204 over the delivery network.

The AS 110 matches a CP 206 and a DP 208 session type—that is, a capability—as a basis for the AS 110 to support applications executing on the UE 102. Within the AP 204 context, the AS 110 utilizes application-level addressing appropriate to the specific service, supporting for example Chat Handles, Voice/Data Phone Numbers, Packet IP Numbers or domain name system (DNS) Names, or Multicast Group IDs, per corresponding standards. Each AS 110 handles external network interoperability protocols as appropriate to the specific service, handling for example Extensible Messaging and Presence Protocol (XMPP) for Chat, VoIP for Voice/Data calls, or IP for Packets, per corresponding standards. The AS 110 supports custom and standard Voice/Data codecs via embedded functionality. In an example embodiment, the AS 110 is positioned within an MSS gateway and provides services for all users of that MSS network. In another example embodiment, the AS 110 is positioned within a specific customer's premises and connected to the CG 108 via a secure private line or network, providing services only for that customer's users of the MSS network to which CG 108 is connected.

Figure 3:
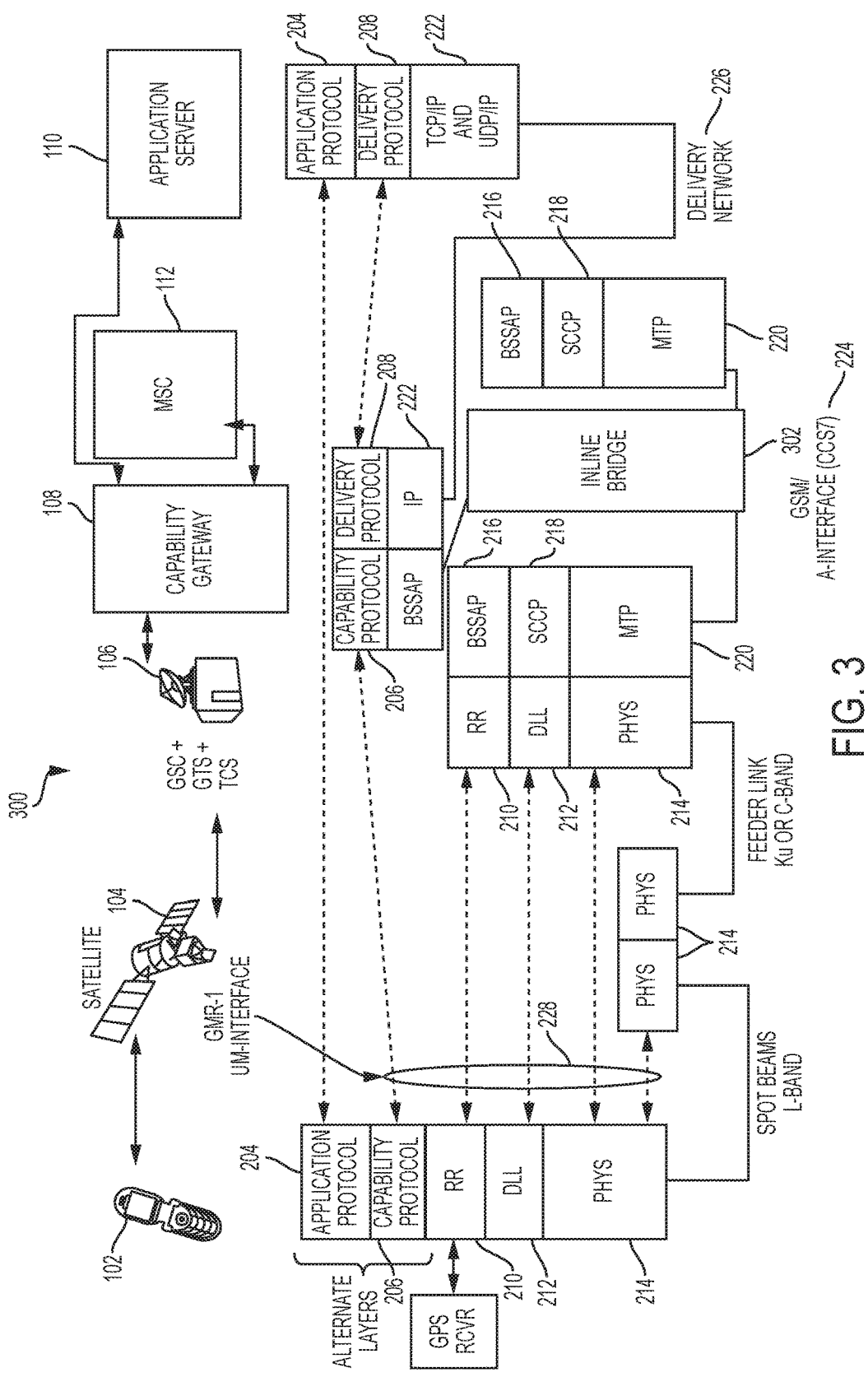
FIG. 3 illustrates an example system utilizing a pass-through implementation of the capability gateway, in accordance with an example embodiment.

FIG. 3 illustrates an example system 300 utilizing a pass-through implementation of the CG 108, in accordance with an example embodiment. In this example embodiment, CG 108 further includes an inline bridge 302. The inline bridge 302 adapts the CG 108 to native topology and protocols of a particular Mobile Switching Server (MSS) Gateway (not shown) in which it is deployed, and provides transparent flow for non-capability enabled mobile equipment's data if necessary, when utilizing an intercession topology. In an example embodiment, the inline bridge 302 is employed when only a single interface between the ground station 106 and the MSC 112 exist within the system 300. The CG 108 and corresponding inline bridge 302 cooperate to pass through an entire stack of a standard protocol to the MSC 112, or the like, for standard terminals that cannot recognize and process the AP 204 and DP 208 disclosed herein. The inline bridge 302 of the CG 108 bridges into an A-interface, such as included with a GMR-1 Gateway.

The inline bridge 302 terminates and regenerates both sides of the A-Interface, for example, both signaling links and Time-division multiplexing (TDM) traffic channels, toward the ground station 106 and MSC 112, respectively. In an exemplary embodiment, the inline bridge 302 detects a difference between standard GMR-1 calls and calls supporting machine-to-machine (M2M) or push-to-talk (PTT) communications, and adapts the IP-based M2M and PTT services implemented by the AS 110 to the GMR-1 network via its processing of legacy BSSMAP, Direct Transfer Application Part (DTAP), and TDM protocols (together generally referred to as BSSAP). The CG 108, via the inline bridge 302, facilitates this adaptation due to its position in the system 300 as an intervener on an A-Interface, and conveys all aspects of standard GMR-1 calls transparently between the ground station 106 and the MSC 112.

Other aspects of CG 108 are unaffected by the presence of inline bridge 302 and operate as described in the context of FIG. 2.

Figure 4A:
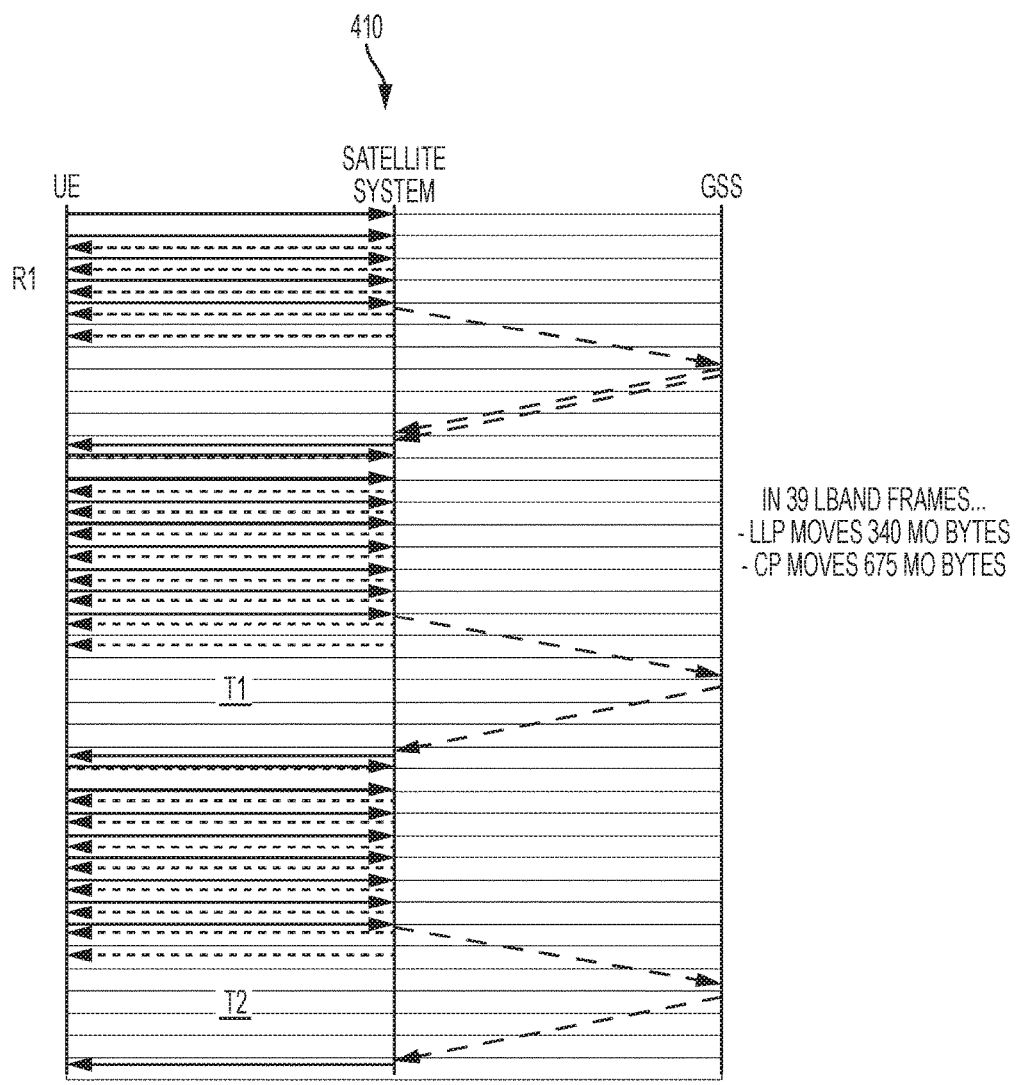
FIGS. 4A and 4B illustrate an example typical store-and-forward messaging communication and enhanced store-and-forward messaging communication, in accordance with an example embodiment.
Figure 4B:
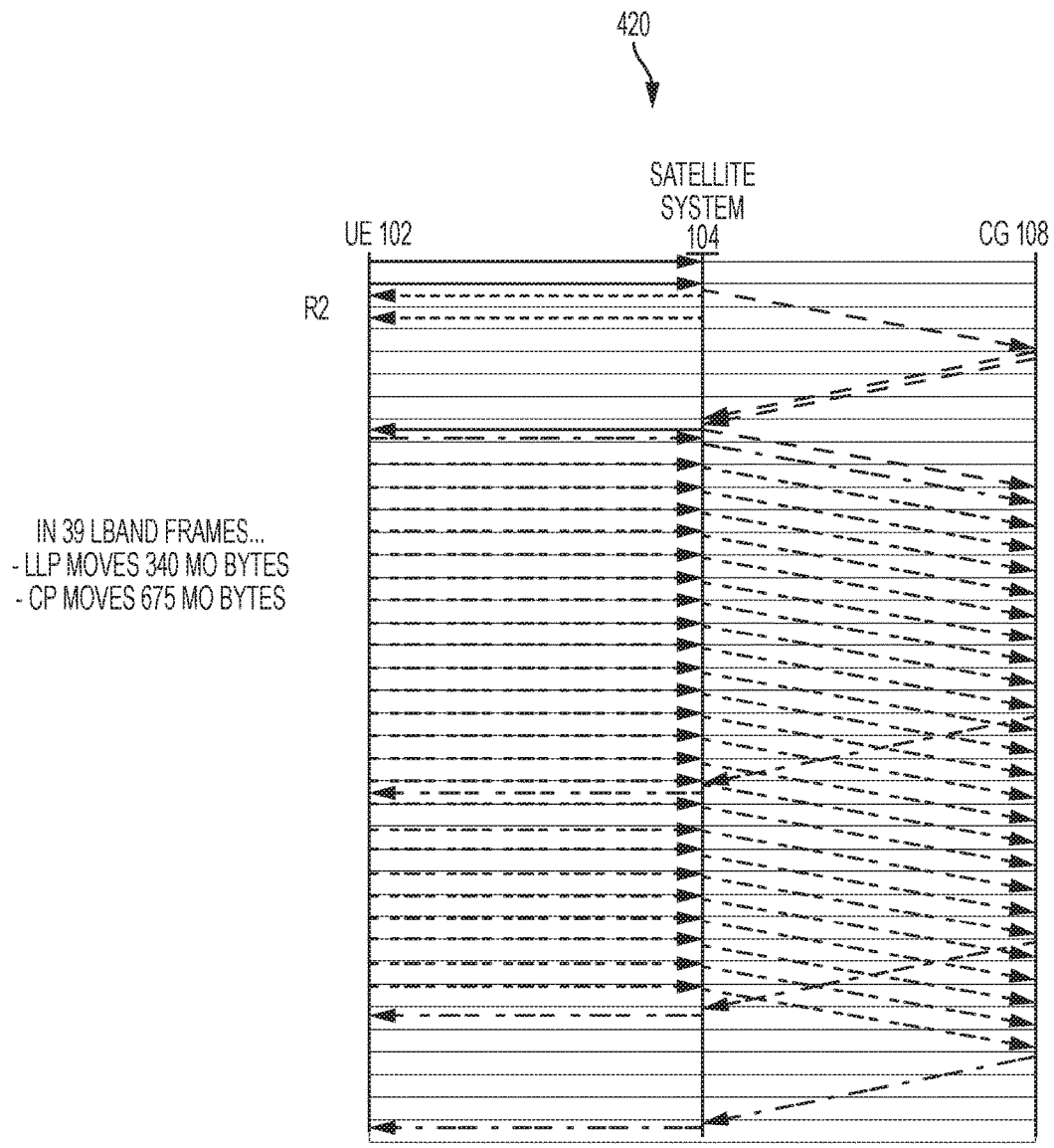

FIGS. 4A and 4B illustrate a typical store-and-forward messaging communication and an example enhanced store-and-forward messaging communication, in accordance with an example embodiment.

FIG. 4A illustrates example typical transmission and reception of user data via store-and-forward messaging, as implemented in Iridium Short Burst Data (SBD) service. The typical transmission and reception of user data is illustrated as occurring between a user equipment and a Gateway SBD Subsystem (GSS), via a satellite system. As described in http://www.icao.int/safety/acp/Inactive%20working%20groups%20library/ACP-WG-M-Iridium-5/IRD-SWG05-WP04-ICAO%20Iridium%20Technical%20Specification%20-%20060821%20v1.21.doc, existing SBD service is built on Iridium signaling, with capability being limited to half-duplex operation. This service provides a data rate that is bounded at ~1200 bps (<half the channel rate). Other factors limit message size to 340 or 1920 bytes, depending on a power class of the user equipment. Current SBD relies on an L-Band Link Protocol (LLP), which is in turn built on an Associate Control Channel for L-Band (ACCHL) protocol (per same ICAO source). Reverse engineering analysis, using tools described in https://events.ccc.de/congress/2015/Fahrplan/system/event_attachments/attachments/000/002/

83 4/original/Iridium-Talk-32c3-final.pdf, indicates that LLP and ACCHL can move 340 MO bytes in as little as 39 Lband frames. This is the sequence that is illustrated in FIG. 4A. Typical SBD service's inefficiency is shown in the large time periods during which acknowledgement is awaited for each block of data prior to transmission of the next block.

Typical SBD service allows a channel to be established quickly, but then is utilized inefficiently. As illustrated, typical SBD includes time periods, for example T1 and T2, in which data is not transmitted from the GSS to the user equipment. There is a need for the user equipment to be on and off the air more quickly. Moreover, there is a need to move larger messages in less time to the user equipment, while still utilizing the low-data-rate single channel user equipment. The user equipment also needs access to such higher-efficiency service via networks besides Iridium. The disclosed example embodiments overcome such deficiencies.

FIG. 4B illustrates an example transmission and reception of user data utilizing enhanced store-and-forward messaging, in accordance with an example embodiment. The UE 102 establishes enhanced store-and-forward messaging communications with the CG 108, via the satellite system 104. The example embodiment illustrated in FIG. 4B establishes enhanced store-and-forward messaging communications between UE 102 and CG 108 more quickly and with a reduced number of messages compared with typical store-and-forward messaging, such as SBD illustrated in FIG. 4A. This is particularly noticeable in FIG. 4A upper region R1 of message exchanges between the user equipment and GSS for typical SBD, and in FIG. 4B upper region R2 of message exchanges between the UE 102 and the CG 108 for enhanced store-and-forward messaging.

Moreover, enhanced store-and-forward messaging utilizes CP 206 to achieve higher performance than typical SBD, moving a greater amount of data in less time. In a comparable analysis to that of FIG. 4A, FIG. 4B shows enhanced store-and-forward messaging utilizing CP 206 being able to move 675 MO bytes in as little as 39 Lband frames. Thus, the example embodiments are able to move more than seventeen times as much data within a same number of Lband frames as typical SBD service. Moreover, in an example embodiment CP 206, unlike LLP, is not processed by the satellite system 104, so there are no protocol-based load limits which allows enhanced store-and-forward messaging to utilize 100% of a channel of the satellite system 104. The example embodiments therefore provides a nominal 2× gain over a typical system in same channel conditions, and achieves larger gains for longer messages in an approximately perfect channel. In an example embodiment on the Iridium network, these gains are accomplished because CP 206 leverages a data frame sub-type that passes through satellite system 104 transparently, vs. LLP's use of the data frame sub-type 2, which is processed non-transparently in satellite system 104. Embodiments in other examples of satellite system 104, or in a comparable terrestrial cellular system, use similar transparent vs. non-transparent techniques.

Additional gains are accomplished using optimizations in the CP 206 as compared with existing protocols. CP 206 provides for reliable carrier signaling, plus user data in messaging-oriented services. CP 206 provides for message delimiting, error correction/detection, retransmission, windowing, etc. The CP 206 provides for stronger coding for lower residual Bit Error Rate (BER) and fewer retransmissions, compared with ACCHL. CP 206 utilizes Reed-Solomon (RS)(255,247) error correction and may be adjusted per application due to transparency by the satellite system 104. The CP 206 provides more payload bits per Protocol Data Unit (PDU), for example 216 Nominal, than Associated Control Channel, L-Band (ACCHL) which is limited to 160, with even stronger coding as noted previously. The CP 206 repurposes unutilized and useless frame header bits typically found in link-layer protocols (C/R, B, P/F, X) for more useful functions, particularly longer sequence numbers which provides for Segmentation and Reassembly (SAR) of large, for example up to 2048 bytes, service data units (SDUs). The CP 206 also supports sharing of a single channel by multiple instances of UE 102 by repurposing an unacknowledged "N" frame (which is not useful in signaling and messaging) to a multi-user "M" frame, with the same purpose and similar structure as an "I" frame except with a 4-bit Service Access Point Identifier (SAPI) instead of longer sequence numbers; CP 206 also adds the SAPI field and longer sequence numbers to a "U" frame and an "S" frame. In an example embodiment, these enhanced features of the CP 206 are only utilized in store-and-forward messaging scenarios that can use them advantageously; LLP continues to be used in cases where it is more efficient, such as sessions that include small Mobile Originated (MO) payloads and no Mobile Terminated (MT) payloads, for example MO payloads of 64 bytes or less.

The system 100 improves on store-and-forward messaging service. In accordance with the example embodiments, enhanced store-and-forward messaging utilizes a CP 206 that is a user-plane protocol to carry data instead of the typical control-plane protocol utilized for store-and-forward messaging services such as SMS or Iridium SBD. Coupled with the faster setup discussed in more detail in FIG. 5, the full-duplex nature of enhanced store-and-forward messaging user-plane protocol supports conveying small messages more quickly than typically possible, or larger messages than can be typically accommodated. The full-duplex nature of the CP 206 user-plane protocol allows the CG 108 to transmit data consistently to the UE 102, and vice versa, eliminating the typical store-and-forward messaging service's time periods, for example T1 and T2, in which data is not transmitted to or from the user equipment.

The system 100 moves messaging transport off a signaling channel mode (as used by, for example, SBD or SMS) onto a traffic channel mode (as used by, for example, circuit switched data (CSD)) without time-consuming CSD setup or use of an external CSD Interworking Function (IWF). In accordance with an example embodiment, the CP 206 provides efficient message transport. In an example embodiment, the CP 206 adds piggybacked link layer establishment signaling such as Set Asynchronous Balanced Mode (SABM) and Unnumbered Acknowledge (UA) to the common access/auth/setup signaling exchange, removing at least one additional round-trip for messaging transport. The CP 206 provides for a pipelined/windowed messaging service protocol that supports messages up to 64 kb or larger and multiple message transfers within a single session. Enhanced store-and-forward messaging can be applied to Iridium, GMR-1, and GSM networks, as well as other networks using related techniques.

Figure 5:
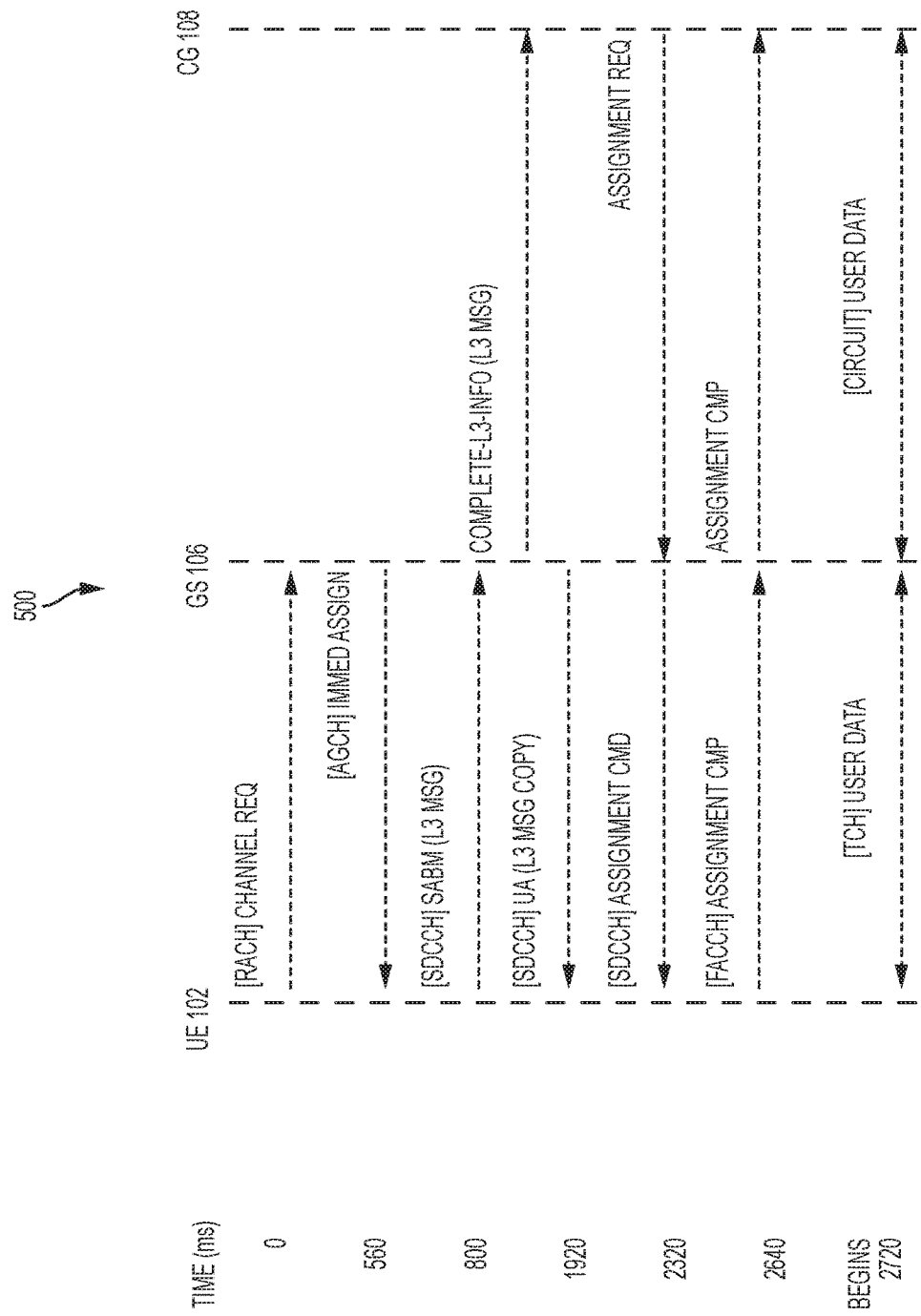
FIG. 5 illustrates an example message flow to establish enhanced store-and-forward messaging communications, in accordance with an example embodiment.

FIG. 5 illustrates an example message flow 500 to establish a channel for enhanced store-and-forward messaging communications, in accordance with an example embodiment based on the GMR-1 standard. For simplicity of explanation, and because in GMR-1 there is no significant processing there, the satellite system 104 that facilitates communications between the UE 102 and the GS 106 is omitted from the message flow 500. Note also that the times of each transmission are relative to the starting time 0; intervals are approximate, and may vary depending on channel conditions, user equipment location, and other factors.

At time 0, the UE 102 transmits a [RACH] CHANNEL REQ message to the ground station 106. The [RACH] CHANNEL REQ message uses the system's random acquisition channel (RACH) to request a traffic channel from the ground station 106. In response to the [RACH] CHANNEL REQ message, the ground station 106 transmits a [AGCH] IMMED ASSIGN message to the UE 102 via the system's access grant channel, which arrives at UE 102 at a time 560 ms. The [AGCH] IMMED ASSIGN message indicates that the ground station 106 has granted access to the UE 102 to a particular channel of the satellite system 104. Thereafter, at a time 800 ms the UE 102 transmits a [SDCCH] SABM (L3 MSG) message to the ground station 106 using the granted signaling channel. The [SDCCH] SABM (L3 MSG) message indicates that the UE 102 is requesting to establish Layer 3 Asynchronous Balanced Mode (ABM) communications via Standalone Dedicated Control Channels (SDCCH) with the ground station 106. In response to the [SDCCH] SABM (L3 MSG) message, the ground station 106 transmits a COMPLETE-L3-INFO (L3 MSG) message to the CG 108. The COMPLETE-L3-INFO (L3 MSG) message indicates that the ground station 106 has established L3 communications with the UE 102. Encapsulated in both the SABM and the COMPLETE-L3-INFO messages is a message (L3 MSG) from UE 102 to CG 108 that is copied from the UE side to the CG side unchanged and is otherwise essentially unprocessed by GS 106. In the standard GMR-1 system, this L3 MSG would be one of the standard messages used to initiate a connection. In the present example providing enhanced store-and-forward messaging service, this L3 MSG is a non-standard structure that accomplishes service request, authentication, and channel pre-setup signaling all in one package, thereby reducing the multiple round-trip times required in the standard to a single one for the enhanced service disclosed herein. The details of this L3 MSG are not shown in FIG. 5, as they may be readily ascertained based on the described functions. The ground station 106 also transmits a [SDCCH] UA (L3 MSG COPY) message to the UE 102, which arrives there at a time 1920 ms. The [SDCCH] UA (L3 MSG COPY) message acknowledges the [SDCCH] SABM (L3 MSG) message to the UE 102. Thereafter, the CG 108 transmits an ASSIGNMENT REQ message to the ground station 106 and the ground station 106 in turn transmits a [SDCCH] ASSIGNMENT CMD message to the UE 102, which arrives at a time 2320 ms. The ASSIGNMENT REQ message requests assignment of a traffic channel for the UE 102 and the [SDCCH] ASSIGNMENT CMD message indicates the channel that has been assigned to the UE 102. Upon tuning to the assigned traffic channel or reconfiguring the existing signaling channel to become a traffic channel, as the case may be, in response to the [SDCCH] ASSIGNMENT CMD message, at a time 2640 ms the UE 102 transmits a [FACCH] ASSIGNMENT CMP message to the ground station 106 via the signaling mode of the traffic channel. The [FACCH] ASSIGNMENT CMP message indicates a logical channel assignment on a digital traffic channel has been completed between the UE 102 and the ground station 106. In response to receiving the [FACCH] ASSIGNMENT CMP message, the ground station 106 transmits an ASSIGNMENT CMP message to the CG 108. The ASSIGNMENT CMP message indicates that assignment of the logical channel on the digital traffic channel has been completed by the ground station 106, and conveys to CG 108 the identity of a circuit that will carry user traffic for this connection. Thus at a time 2720 ms the UE 102 and the CG 108 begin to transmit and receive User Data messages therebetween. The UE 102 transmits and receives User Data with the ground station 106 via the agreed traffic channel (TCH) in traffic mode, and the ground station 106 transmits and receives the User Data with the CG 108 via the identified Circuit of a circuit switched communication network between the ground station 106 and the CG 108. The specific User Data conveyed in this path is minimally processed and relayed transparently by GS 106, allowing end to end data flow between UE 102 and CG 108. In an example embodiment, a version of the CP 206 tuned for this path but providing all the capabilities previously described is used to support enhanced store-and-forward messaging service.

The message flow 500 allows the UE 102 to establish data communications more quickly than is typically possible. Depending on session type and channel conditions, user data flows between the UE 102 and the CG 108 at least 4.5 seconds earlier than in a typical basic call.

Figure 6:
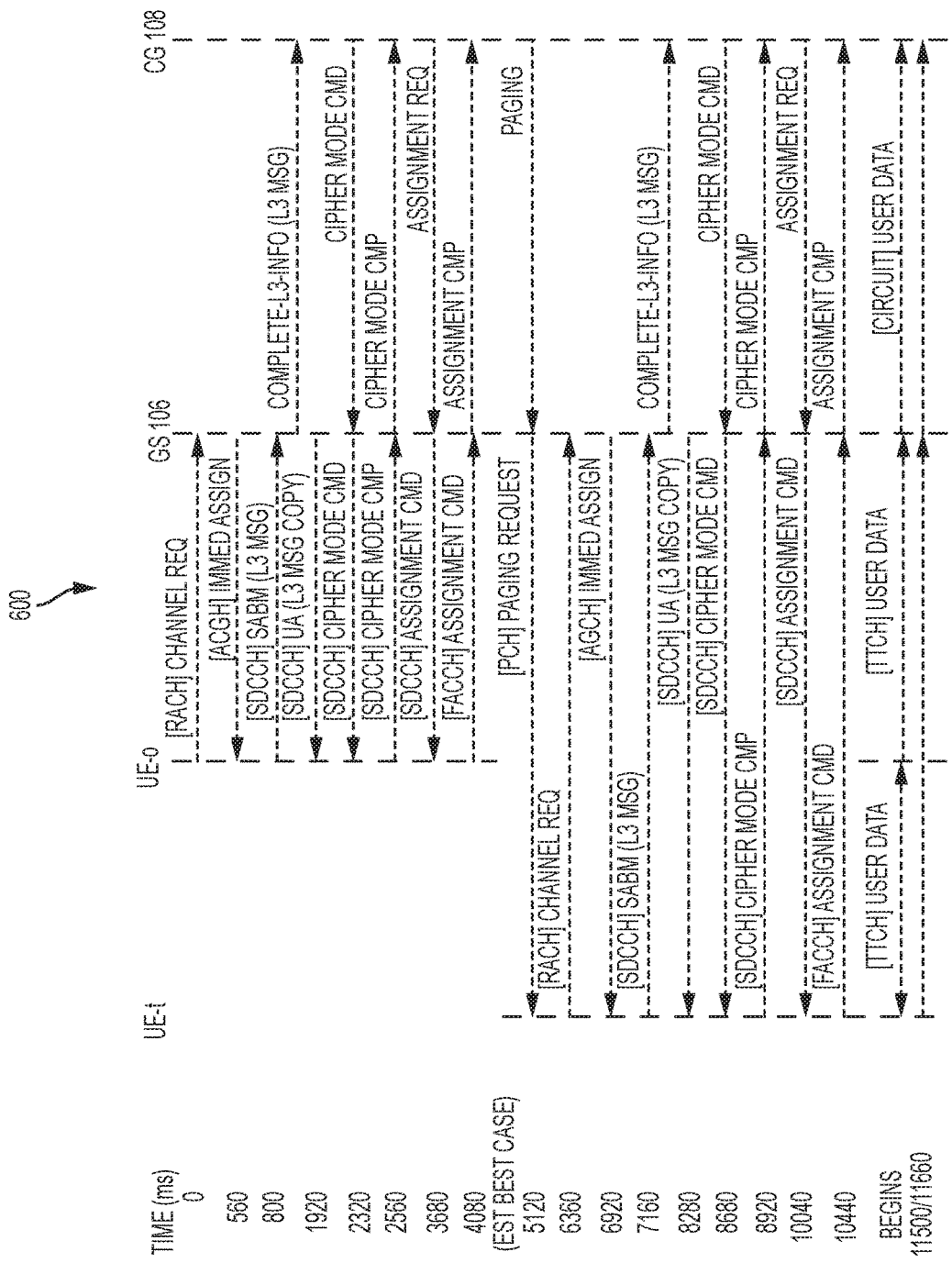
FIG. 6 illustrates an example message flow to establish Terminal-to-Terminal communications between at least two user equipment, in accordance with an example embodiment.

FIG. 6 illustrates an example message flow 600 to establish Terminal-to-Terminal communications between at least two UE 102, in accordance with an example embodiment based on the GMR-1 standard. For simplicity of explanation, and because in GMR-1 there is no significant processing there, the satellite system 104 that facilitates communications between a UE-o, a UE-t, and the GS 106 is omitted from the message flow 600. Note also that the times of each transmission are relative to the starting time 0; intervals are approximate, and may vary depending on channel conditions, user equipment location, and other factors.

For an example of how the sequence in FIG. 6 might be used, consider that typical GMR does not offer its customers a voice PTT service that provides true multicast. Adequate performance is not achievable utilizing standards-based architectures such as Multiparty (MPTY) conference calls over GMR or Push-to-talk over Cellular (POC) over Geostationary-satellite Mobile Packet Radio Service (GMPRS), without having to upgrade the network to GMR-3G. For typical GMR networks, the only PTT solutions available are based on GMR-3G with POC. Utilizing the system 100/200/300, Terminal-to-Terminal (TtT) call setup is optimized in a GMR-based network, thereby establishing a single-hop connection more efficiently than in the typical GMR-based network. With this kind of call, a multi-user PTT group uses the channels so established to exchange voice and data amongst themselves with the shortest possible delay.

Two topologies can be implemented with the systems 100/200/300. A first topology that can be implemented with the systems 100/200/300 is a single-beam topology, in which all UE 102 will have their communications reflected immediately by the satellite system 104 due to the establishment of a TtT connection via sequence 600. The second topology is a multi-beam topology, in which all communications are backhauled to the CG 108 and reflected back out from the CG 108; each channel in this topology is established using sequence 500. In both topologies, inter-UE communication occurs via the CP 206 and a PTT-specific AP 204, and communications are available at the CG 108 for propagation to UE(s) 102 in other networks. Even in the single-beam topology, communications are available at the CG 108 because GMR TtT connections are copied to the GS 106 by satellite system 104, and thence to the CG 108.

In FIG. 6 two UEs 102 are illustrated, an originating user equipment UE-o and a terminating user equipment UE-t. In accordance with the time period up to and including 4080 ms, the UE-o communicates with the GS 106 and the GS 106 communicates with the CG 108 with the same messaging as explained above in FIG. 5 for the time period up to 2720 ms, except that a CIPHER MODE CMD/CMP pair is inserted in order to accomplish certain GMR-specific aspects of the TtT call, thereby shifting some of the times so that they occur at 560 ms, 800 ms, 1920 ms, 2320 ms, 2560 ms, 3680 ms, and 4080 ms, respectively, as illustrated in FIG. 6.

Thereafter, the messages explained in FIG. 6 include the CG 108 transmitting a PAGING message to the ground station 106 and the ground station 106 in turn transmitting a [PCH] PAGING REQUEST message to the UE-t, which arrives at an estimated time 5120 ms. The PAGING message and the [PCH] PAGING REQUEST message inform the UE-t that it should request a channel for its half of the TtT call, which it accomplishes by, at a time 6360 ms, transmitting a [RACH] CHANNEL REQ message to the ground station 106. The [RACH] CHANNEL REQ requests a random acquisition channel (RACH) from the ground station 106. Thereafter, at a time 6920 ms the ground station 106 transmits a [AGCH] IMMED ASSIGN to the UE-t. Here again, the sequence through ASSIGNMENT CMP is identical to that already described, except for the timings as shown in FIG. 6 and the various parameters specific to UE-t that are not shown. Then, at a time 11500/11660 ms, the UE-t and UE-o exchange user data via the assigned TtT traffic channel (TTCH). As previously noted, the user data consists of CP 206 and AP 204 protocol elements accomplishing the PTT service. Data sent by the UE-o and the UE-t to one another are also transmitted to the ground station 106 via a TCH assigned to each UE, due to the copying behavior at satellite system 104 described previously and not shown. In turn the ground station 106 relays these copies of the user data (again, CP 206 and AP 204 protocol elements) via the assigned Circuit of a circuit switched communication network between the ground station 106 and the CG 108.

With the example message flow 600, data flows between UE-o and UE-t about 8 seconds earlier than in a typical TtT communication. To use this sequence in, for example, a PTT call, the TtT connection once established can be shared for group communication by applying the multi-user channel sharing principles found in U.S. Pat. No. 8,681,690, incorporated herein by reference. Moreover, the UE 102 to CG 108 call setup can be optimized according to the discussion above in FIGS. 4 and 5 for fast establishment of backhaul connections.

In an example, the systems 100/200/300 provides a mechanism to establish TtT and Terminal-to-Gateway (TtG) connections in GMR-1 networks, anchored on the CG 108, without relying on the verbose standard MM and CC signaling. The disclosed TtT and TtG communications can be deployed in the Thuraya network, for example, to provide voice PTT service with true-multicast efficiency. In an alternate example embodiment, the disclosed TtT and TtG communications can be applied to other MSS networks.

In accordance with the example embodiments disclosed herein, the TtT connection includes two channels, providing the group communication throughput that is double that of typical solutions, such as the PTT Over Cellular (POC) standard. Also, because the TtT channels are connected directly to one another in the satellite system 104, the group communication latency once established is less than half that of a standards-based solution such as POC over GMPRS, which uses a ground network element to reflect traffic from one group member back out to all other group members.

Figure 7:
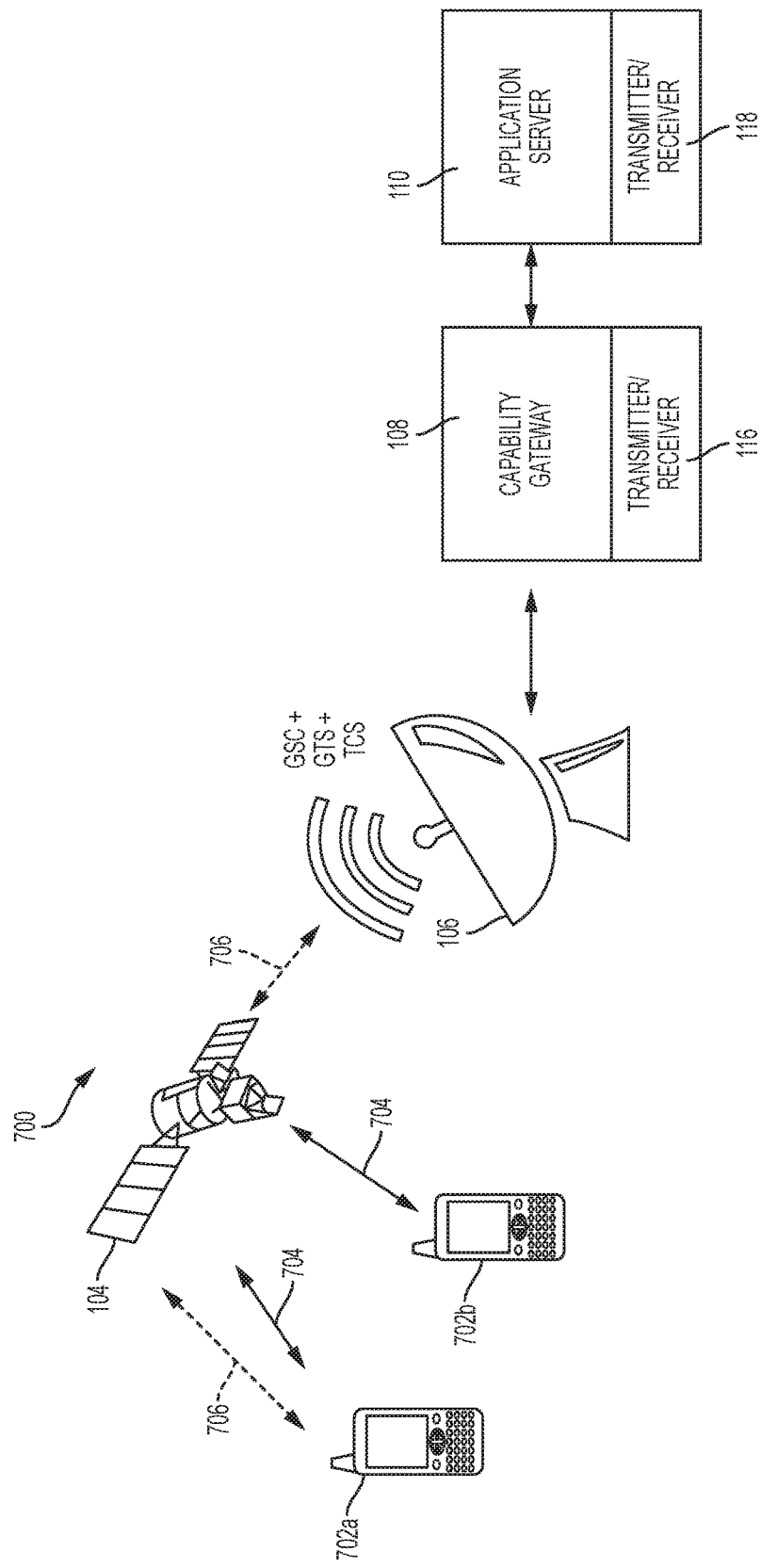
FIG. 7 illustrates an example system to establish group communications between user equipment under control of the capability gateway, in accordance with an example embodiment.

FIG. 7 illustrates an example system 700 to establish group communications between user equipment 702a and 702b under control of the CG 108, in accordance with an example embodiment.

Typical Iridium's PTT service utilizes special channels that exist in a separate allocation pool from ordinary traffic channels. Iridium's PTT services are available in two forms. The first, Phase 2 DTCS operates exclusively under satellite control and lacks an opportunity for backhaul to a gateway device. The second, DTCS Global Services and Commercial PTT operate exclusively under gateway device control and provide no means for low-latency satellite-only traffic handling.

The system 700 overcomes such deficiencies. The system 700 establishes communications between multiple UEs 702 via the satellite system 104. The system 700 optimizes establishment of a single-party connection as discussed above for FIG. 4B. In this example, UE 702a initially establishes communications 706 with the CG 108 utilizing the exchange of messages discussed above in FIG. 4B. However, thereafter instead of the UE 102 establishing enhanced store-and-forward messaging service with the CG 08 discussed above in FIG. 4B, the UE 702a establishes TtT communications 704 with one or more other UEs 702b.

The system 700 utilizes a variant of Iridium cut-through, also known as satellite-network intraswitching as originally described in U.S. Pat. Nos. 5,523,997 and 5,509,004 to effect a self-cut-through of the single channel established by UE 702a back onto itself. Note that this single-channel self-cut-through variant was not contemplated by and is not described in the cited earlier patents. This effectively creates a same kind of net channel that DTCS Phase 2 provides under satellite control, with satellite-only traffic handling, but under control of the disclosed CG 108 instead. Then, UE 702a and 702b establish CP 206 and AP 204 communications 704 therebetween via the satellite system 104, without having to communicate with the CG 108. In an example embodiment, the CG 108 continues to maintain control 706 over the communications 704 between UE 702a and UE 702b, via the satellite system 104. In an example embodiment, the example group communication service under control of the CG 108 of the system 700 shown in FIG. 7 are utilized in combination with the multi-user channel sharing disclosed in U.S. Pat. No. 8,681,690.

The system 700 can be applied to various topologies utilizing conventional two-channel cut-through from U.S. Pat. Nos. 5,523,997 and 5,509,004, self cut-through, and split cut-through (a variant that can send each of the different frame subtypes to a different destination in the combined satellite and ground network, as opposed to the prior art case from U.S. Pat. Nos. 5,523,997 and 5,509,004 in which all subtypes are sent to the same destination) that include, but are not limited to: a two-channel topology that is similar to the GMR TtT call discussed in FIG. 6, a multi-beam ring topology that may or may not include participation of the CG 108 for backhaul communications, a compound topology that uses a star network for communicating Position Location Information (PLI) data via the CG 108 while utilizing local reflection in each beam for voice, and numerous others.

Figure 8:
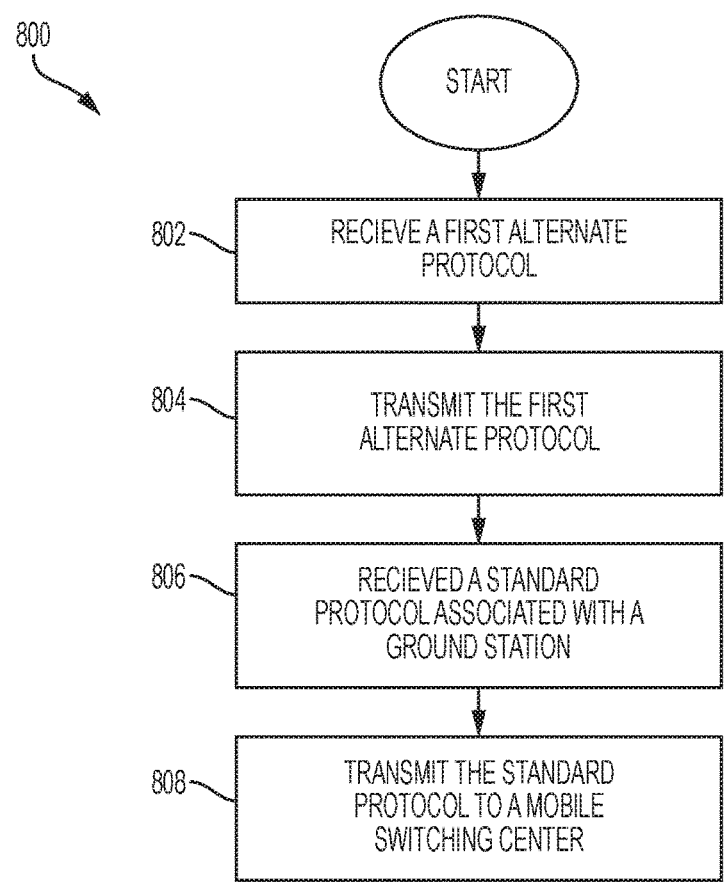
FIG. 8 illustrates an example satellite communication method utilizing alternate service layers, in accordance with an example embodiment.

In view of the foregoing structural and functional features described above, a method in accordance with various aspects of the present disclosure will be better appreciated with reference to FIG. 8. While, for purposes of simplicity of explanation, the method of FIG. 8 is shown and described as executing serially, it is to be understood and appreciated that the present disclosure is not limited by the illustrated order, as some aspects may, in accordance with the present disclosure, occur in different orders and/or concurrently with other aspects from that shown and described herein. Moreover, not all illustrated features may be required to implement a method in accordance with an aspect of the present disclosure. Moreover, for simplicity of explanation, the methods of FIG. 8 can include additional functional features not discussed, with FIG. 8 being described with reference to the examples illustrated herein.

FIG. 8 illustrates an example satellite communication method 800 utilizing non-standard alternate service layers, in accordance with an example embodiment. At 802, a standard protocol and a non-standard alternate protocol are received. The CG 108 receives, via the transmitter/receiver 116, the standard protocol associated with the ground station and the non-standard alternate protocol from the ground station 106, via with the satellite system 104. The standard protocol provides end-to-end signaling and data transport between the ground station 106 and the CG 108. The non-standard alternate protocol includes non-standard alternate service layers that are inserted into an inter-layer boundary of standard radio layers. The UE 102 inserts the CP 206 into the inter-layer boundary of standard radio layers, for example above RR 210. In an example embodiment, the UE 102 also inserts the AP 204 into the inter-layer boundary of standard radio layers above CP 206. As discussed above, the CP 206 provides end-to-end signaling and data transport between the CG 108 and the UE 102. The AP 204 provides end-to-end signaling and data transport between the AS 110 and the UE 102.

At 804, the non-standard alternate protocol is transmitted. The CG 108 transmits, via the ground station 106 and the satellite system 104, the CP 206, and in an example embodiment the AP 204 elements received from the AS 110, to the UE 102. As discussed above, the CG 108 also transmits the AP 204 elements received, via the satellite 104 and the ground station 106, from the UE 102 to the AS 110. In an example embodiment, the CG 108 communicates with each AS 110 via the delivery network 226 utilizing TCP/IP and/or UDP/IP 222. The CG 108 further relies on the DP 208 to communicate with the AS 110. The CG 108 transmits AP 204 elements received from the UE 102 to the AS 110 via the DP 208.

At 806, in an example embodiment the CG 108 further receives a standard protocol associated with the GS 106. In particular, the inline bridge 302 of the CG 108 receives the standard protocol associated with the GS 106, for example BSSAP, SCCP, and MTP.

At 808, the standard protocol received at 806 is transmitted to the MSC 112. The CG 108 transmits, via the inline bridge 302, the standard protocol received at 806 to the MSC 112.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A capability gateway, comprising:
a receiver to receive, from a ground station associated with a satellite system, a standard protocol associated with the ground station and a non-standard alternate protocol that includes alternate service layers inserted into an inter-layer boundary of standard radio layers, the non-standard alternate protocol being inserted into the inter-layer boundary above a Radio Resources (RR) protocol layer of the standard radio layers and the alternate service layers providing end-to-end signaling and data transport between the capability gateway and a user equipment, the standard protocol being a protocol that is standardized by a standard workgroup; and
a transmitter to transmit the non-standard alternate protocol to the user equipment.

2. The capability gateway according to claim 1, wherein the non-standard alternate protocol is a first non-standard alternate protocol, wherein:
the receiver further receives a second non-standard alternate protocol providing end-to-end signaling and data transport between the user equipment and an application server; and
the transmitter further transmits the second non-standard alternate protocol to the application server.

3. The capability gateway according to claim 2, wherein the capability gateway utilizes a third non-standard alternate protocol to communicate with the application server, the third nonstandard alternate protocol providing end-to-end signaling and data transport between the capability gateway and the application server.

4. The capability gateway according to claim 1, wherein the non-standard alternate protocol is inserted into the inter-layer boundary above the Radio Resources (RR) protocol layer of the standard radio layers at the user equipment.

5. The capability gateway according to claim 1, wherein the satellite system is one of the Thuraya satellite system and the Iridium satellite system.

6. The capability gateway according to claim 1, wherein the non-standard alternate protocol is a user-plane protocol to establish store-and-forward messaging communications between the user equipment and the capability gateway.

7. The capability gateway according to claim 6, wherein the user-plane protocol is a fullduplex protocol.

8. The capability gateway according to claim 1, further comprising an inline bridge to receive a standard protocol associated with the ground station and to transmit an entire stack of the standard protocol to a mobile switching center via a GSM A-Interface.

9. The capability gateway according to claim 1, wherein capability gateway establishes, with the non-standard alternate protocol, push-to-talk communications between the user equipment and at least one other user equipment, the push-to-talk communications being added to a terminal-to-terminal communication established between the user equipment and the at least one other user equipment with the standard protocol associated with the ground station.

10. A capability gateway, comprising:
a receiver to receive, from a ground station associated with a satellite system, a standard protocol associated with the ground station and a non-standard alternate protocol that includes alternate service layers inserted into an inter-layer boundary of standard radio layers, the alternate service layers providing end-to-end signaling and data transport between the capability gateway and a user equipment, the standard protocol being a protocol that is standardized by a standard workgroup; and
a transmitter to transmit the non-standard alternate protocol to the user equipment;
wherein the receiver further receives a second non-standard alternate protocol providing end-to-end signaling and data transport between the user equipment and an application server and the transmitter further transmits the second non-standard alternate protocol to the application server; and wherein the receiver further receives, from the user equipment and in a single combined service request, a non-standard L3 MSG message that performs a service request, authentication, and channel pre-setup.

11. A communication method, comprising:
receiving, at a capability gateway from a ground station associated with a satellite system, a standard protocol associated with the ground station and a non-standard alternate protocol that includes alternate service layers inserted into an inter-layer boundary of standard radio layers, the non-standard alternate protocol being inserted into the inter-layer boundary above a Radio Resources (RR) protocol layer of the standard radio layers and the alternate service layers providing end-to-end signaling between the capability gateway and a user equipment, the standard protocol being a protocol that is standardized by a standard workgroup; and
transmitting the non-standard alternate protocol to the user equipment.

12. The communication method according to claim 11, wherein the non-standard alternate protocol is a first non-standard alternate protocol, wherein the satellite communication method further comprises:
receiving a second non-standard alternate protocol providing end-to-end signaling between the user equipment and an application server; and
transmitting the second non-standard alternate protocol to the application server.

13. The communication method according to claim 11, wherein the non-standard alternate protocol is inserted into the inter-layer boundary above the Radio Resources (RR) protocol layer of the standard radio layers at the user equipment.

14. The communication method according to claim 11, further comprising establishing store-and-forward messaging communications between the user equipment and the capability gateway with the non-standard alternate protocol, wherein the non-standard alternate protocol is a userplane protocol.

15. The communication method according to claim 11, further comprising establishing, with the non-standard alternate protocol, push-to-talk communications between the user equipment and at least one other user equipment, the push-to-talk communications being added to a terminal-to-terminal communication established between the user equipment and the at least one other user equipment with the standard protocol associated with the ground station.

16. The communication method according to claim 11, further comprising:
receiving a standard protocol associated with the ground station; and
transmitting an entire stack of the standard protocol to a mobile switching center via a GSM A-Interface.

17. A communication method, comprising:
receiving, at a capability gateway from a ground station associated with a satellite system, a standard protocol associated with the ground station and a non-standard alternate protocol that includes alternate service layers inserted into an inter-layer boundary of standard radio layers, the non-standard alternate protocol being inserted into the inter-layer boundary above a Radio Resources (RR) protocol layer of the standard radio layers and the alternate service layers providing end-to-end signaling between the capability gateway and a user equipment, the standard protocol being a protocol that is standardized by a standard workgroup; and
transmitting the non-standard alternate protocol to the user equipment;
wherein the non-standard alternate protocol is a first non-standard alternate protocol, wherein the satellite communication method further comprises:
receiving a second non-standard alternate protocol providing end-to-end signaling between the user equipment and an application server;
transmitting the second non-standard alternate protocol to the application server; and
receiving, from the user equipment and in a single combined service request, a non-standard L3 MSG message that performs a service request, authentication, and channel pre-setup.

18. A capability gateway, comprising:
a receiver to receive, from a ground station associated with a satellite system, a standard protocol associated with the ground station and first and second non-standard alternate protocols that includes alternate service layers inserted into an inter-layer boundary of standard radio layers, the first and second non-standard alternate protocols being inserted into the inter-layer boundary above a Radio Resources (RR) protocol layer of the standard radio layers and the alternate service layers providing end-to-end signaling between the capability gateway and a user equipment and end-to-end signaling between an application server and the user equipment;
a transmitter to transmit the first and second non-standard alternate protocols to the user equipment and to transmit the second non-standard alternate protocol to the application server; and
an inline bridge to receive the standard protocol associated with the ground station and transmit the standard protocol associated with the ground station to a mobile switching center via a GSM A-Interface.

19. The capability gateway according to claim 18, wherein the first and second non-standard alternate protocol alternate protocols are inserted into the inter-layer boundary above a Radio Resources (RR) protocol layer of the standard radio layers at the user equipment.

20. The capability gateway according to claim 18, wherein the first non-standard alternate protocol is a userplane protocol to establish store-and-forward messaging communications between the user equipment and the capability gateway.

* * * * *